UNITED STATES PATENT OFFICE.

RICHARD HEINRICH DEUTSCHMANN, OF HAMBURG, GERMANY.

PROCESS OF OBTAINING CURATIVE ANIMAL SERUM.

No. 906,207.      Specification of Letters Patent.      Patented Dec. 8, 1908.

Application filed May 9, 1907. Serial No. 372,800.

*To all whom it may concern:*

Be it known that I, RICHARD HEINRICH DEUTSCHMANN, a subject of the German Emperor, and resident of Hamburg, Germany, have invented certain new and useful Processes of Obtaining Curative Animal Serum, of which the following is a specification.

This invention relates to a process for obtaining animal sera, and more particularly for obtaining such sera as are used for curative purposes against specific diseases.

With the processes hitherto practiced, the animals were infected with the disease-exciters in daily increasing doses, until the animals were rendered immune against the same, whereupon the serum was separated from the blood of the animals. With my improved process, however, each animal is infected but once with a dose of the germ of the particular infectious disease, against which the serum is to be used. This dose must be just sufficient to afflict the animal with the disease. As to the exact quantities of the disease-exciters with which the animals are to be infected, no general rules can be given, as the doses vary with the age, weight and general constitution of the animal, but such doses may be readily ascertained by persons skilled in serum-therapeutics. After the animal has thus been once properly infected, yeast is added to its food in daily increasing doses, until the animal has completely recovered, according to the method described in my co-pending application filed August 14, 1906, Serial No. 330,589. Also for the exact doses of yeast no general data can be given, as they vary with the peculiar germs and general constitution of the animals. To ascertain the individual doses is a matter very familiar to persons skilled in the science. After the animal has recovered, it is bled and the serum is separated from the blood thus obtained. The serum prepared in the manner described constitutes a curative against that peculiar disease, with the germs of which the animal was infected.

Example: A serum against tuberculosis is prepared in the following manner:—Horses are infected with a dose of tubercle bacilli, consisting of several rods of a tubercle bacilli culture swelled in a physiological solution of sodium chlorid. The horses are then given yeast with their fodder, in quantities of about 150–300 grams daily, the dose being gradually increased up to 900 grams. As soon as the horses have thus been cured of the artificially produced infection, they are bled and the serum is extracted.

I claim:

Process of obtaining curative animal serum, which consists in administering to an animal a single infection of the germs of a disease against which the serum is to be used, adding increasing doses of yeast to the food of the animal; bleeding the animal, and separating the serum from the blood thus obtained, substantially as specified.

Signed by me at Hamburg, Germany, this 27" day of April 1907.

RICHARD HEINRICH DEUTSCHMANN.

Witnesses:
    AUGUST WENK,
    J. POTHS.